United States Patent [19]
Chancey et al.

[11] Patent Number: 5,337,840
[45] Date of Patent: Aug. 16, 1994

[54] IMPROVED MUD MOTOR SYSTEM INCORPORATING FLUID BEARINGS

[75] Inventors: Roger Chancey, Humble, Tex.; Robert J. Champagne, Jr., Lafayette, La.

[73] Assignee: International Drilling Systems, Inc., Lafayette, La.

[21] Appl. No.: 989

[22] Filed: Jan. 6, 1993

[51] Int. Cl.$^5$ ............................ E21B 4/02; F16J 15/32
[52] U.S. Cl. .................................... 175/107; 277/164; 277/205
[58] Field of Search ............... 175/107; 277/102, 117, 277/121, 124, 164, 205

[56] References Cited

U.S. PATENT DOCUMENTS

| | | | |
|---|---|---|---|
| 3,807,513 | 4/1974 | Kern et al. | 175/107 |
| 3,840,080 | 10/1974 | Berryman | 175/107 |
| 4,133,542 | 1/1979 | Janian et al. | 277/205 X |
| 4,706,970 | 11/1987 | Ramirez | 277/205 |

FOREIGN PATENT DOCUMENTS

0033221 8/1981 European Pat. Off. ............ 277/164

*Primary Examiner*—David J. Bagnell
*Attorney, Agent, or Firm*—Pravel, Hewitt, Kimball & Krieger

[57] ABSTRACT

An improved mud motor system for drilling or workover down hole which includes an upper stator portion housed within a stator body connectedly engaged to a drill or workover string. The stator receives a flow of drilling mud through the drill or workover string, and flow of mud through a continuous bore of a certain profile within the stator, imparts rotation to the rotor. The lower end of the rotor is engaged to a first upper drive shaft, which is in turn connected to an upper and lower output shaft. Rotation of the rotor likewise imparts rotation to the drive and output shafts. There is provided a drill bit or specialty bit secured to the lower end of the lower output shaft which, when rotation is in effect, drills into the formation or performs various workover operations.

There is further provided fluid bearings within the assembly to provide a quantity of fluid to bear against the lower (or upper) output shaft, so that the shaft contacts the fluid bearing when the shaft is forced upward or down depending on the type of operation taking place.

26 Claims, 13 Drawing Sheets

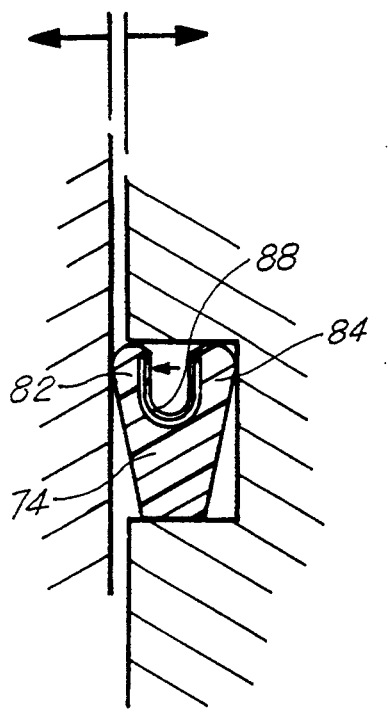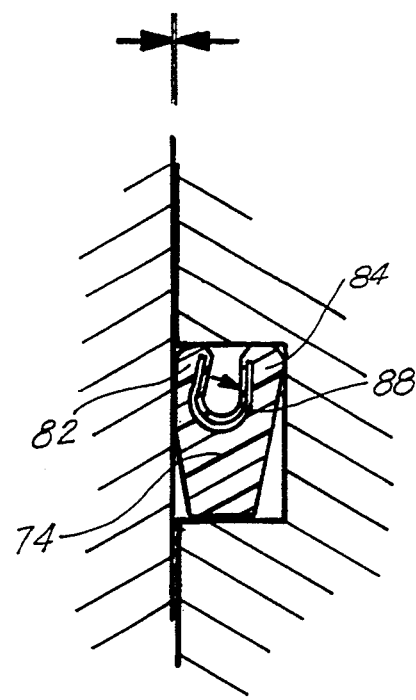
FIG. 14                    FIG. 15

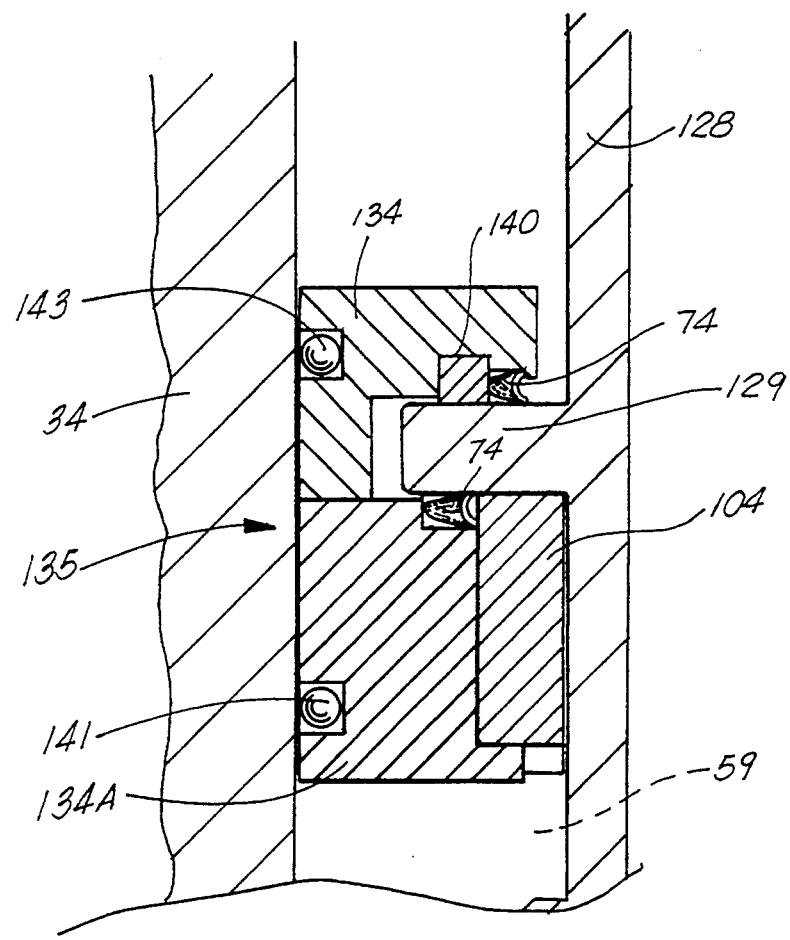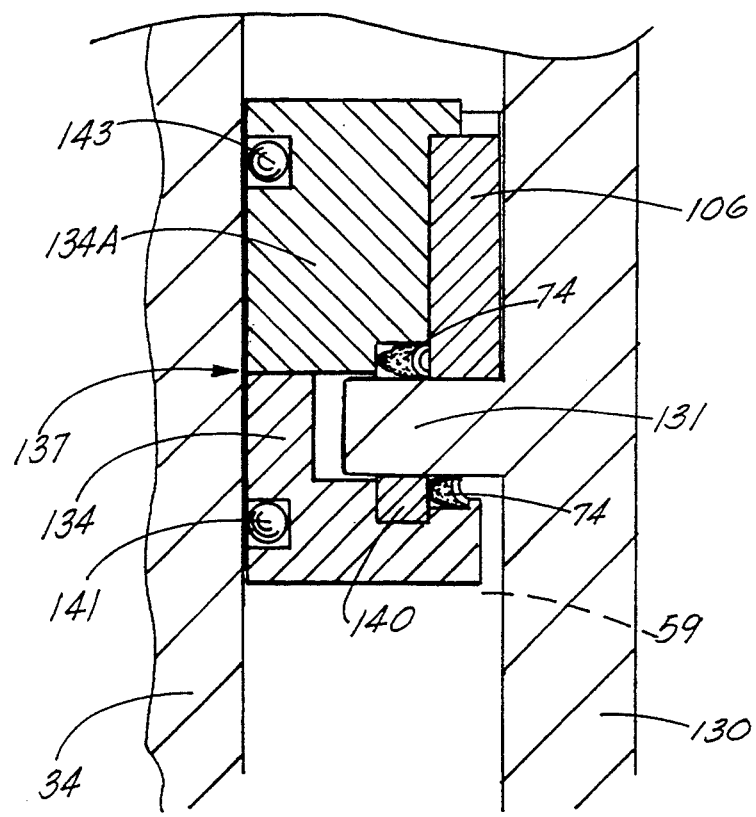
FIG. 20

IMPROVED MUD MOTOR SYSTEM INCORPORATING FLUID BEARINGS

BACKGROUND OF THE INVENTION

1. Field of the Invention

The present invention relates to mud or suitable liquid motor systems. More particularly, the present invention relates to an improved system for a mud motor which incorporates fluid bearings within the system, and eliminates leakage of fluid within the system through a unique sealing assembly.

2. General Background

The utilization of a mud driven motor for rotating a drill or other specialty bit in the process of drilling oil or workover wells is well known. The system would normally include a rotor assembly housed within an exterior stator, with the rotor coupled to the upper end of a drive shaft, several upper and lower output shafts engaged to a drill bit. Mud is run through the stator/rotor assembly, which causes the rotor to rotate, which in turn provides rotation to the drill bit. The mud is recycled to the surface, where, after undergoing treatment is recirculated though the mud motor system downhole.

Of course, when drive or output shafts are housed within an exterior casing or stator assembly, the rotation of the shafts generate friction and wear. To prevent this detrimental effect, the internal spaces between the shaft and its housing are usually provided with a lubricating fluid, which is effectively sealed within the space so that the wear of the shaft is reduced by the lubricant. Or, a certain amount of mud is allowed to "leak" through the bearings. Of course, the lubricating fluid must be maintained within a sealed area, since it cannot mix with the mud driving the motor (if it is the sealed bearing design of motor).

However, oftentimes, during the drilling process utilizing a mud motor system, the thrust produced on the formation results in a certain amount of vibration and other movement of the shafts within the motor casings. This side-to-side movement of the shafts creates an instantaneous and minute gap between the sealing members around the shaft and the shaft seal diameter. The result is usually the seepage of the lubricating oil out of the system, and movement of the oil into the mud system, or worse yet, loss of sufficient oil due to leakage, that the shaft is rotating within its housing with no or little lubrication which could result in excessive wear or seizure of the motor.

A second problem encountered in the mud motor systems utilized today is the amount of damage (short life) that these systems undergo due to insufficient thrust bearing assemblies in the systems. The common metal-to-metal or metal-to-rubber bearing systems result in a great amount of wear during drilling, and lend to the leakage problem heretofore discussed. When, of course, the bearings wear, they must be changed, or the result could be loss of the entire system. This is time-consuming and expensive.

There have been several patents noted in applicant's prior art statement provided herewith which address the general subject matter of mud motor systems, but fail to correct the problems as cited.

SUMMARY OF THE PRESENT INVENTION

The system of the present invention solves the problems in the art in a simple and straightforward manner. What is provided is an improved mud (or liquid) motor system for drilling or workover down hole which includes an upper rotor portion housed within a stator body connectedly engaged to a drill or workover string. The stator assembly receives a flow of drilling fluid through the drill or workover string, and flow of fluid through a continuous bore of a certain profile within the stator, imparts rotation to the rotor. The lower end of the rotor is engaged to a drive shaft, which is in turn connected to upper and lower output shafts. Rotation of the rotor likewise imparts rotation to the drive and output shafts. There is provided a drill or specialty bit secured to the lower end of the lower output shaft which, when rotation is in effect, drills into the "formation" or performs some specialty function.

There is further provided a sealing section within the system which defines a plurality of seals to seal against leaking of lubricating fluid within the output shaft sections. These seals incorporate a flexible member within the seal body to allow the seal to move in unison with the side-to-side movement of the drive shafts, to prevent gaps between the seal and the output shaft bodies. Further there is provided fluid bearings within the assembly which incorporate a quantity of fluid to bear against the lower output shaft, so that the shaft contacts the fluid bearing when the shaft is forced upward (or down depending on the type of operation and fluid bearing design incorporated in the assembly).

It should be kept in mind that this bit and assembly is used generally to drill small bores using coiled tubing, cleaning wells, to under ream, and for special surface drilling, and therefore is rather small in diameter for such tasks.

Therefore, it is a principal object of the present invention to provide a liquid motor drilling system which utilizes a spring (or equivalent) supported fluid seal so that lateral movement of the components in the system do not allow leakage between the seals and the component bodies.

It is a further principal object of the present invention to provide an improved liquid motor system for drilling or workover which provides fluid bearings within the system to allow output shafts to bear axial thrust to reduce metal-to-metal or metal-to-rubber contact when force is placed on the output shafts.

It is a further object of the present invention to provide a mud motor system which incorporates a novel system of fluid seals and fluid bearings to eliminate leaking of fluid in the system, and to help sustain the components from unnecessary wear due to less metal-to-metal or metal-to-rubber contact.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIGS. 14 and 15 illustrate isolated cross section views of the flexing movement of the sealing members utilized in the preferred embodiment of the system of the present invention;

FIG. 20 illustrates yet an additional embodiment of the sealing assembly in the system of the present invention.

DETAILED DESCRIPTION OF THE PREFERRED EMBODIMENT

Figure 1:
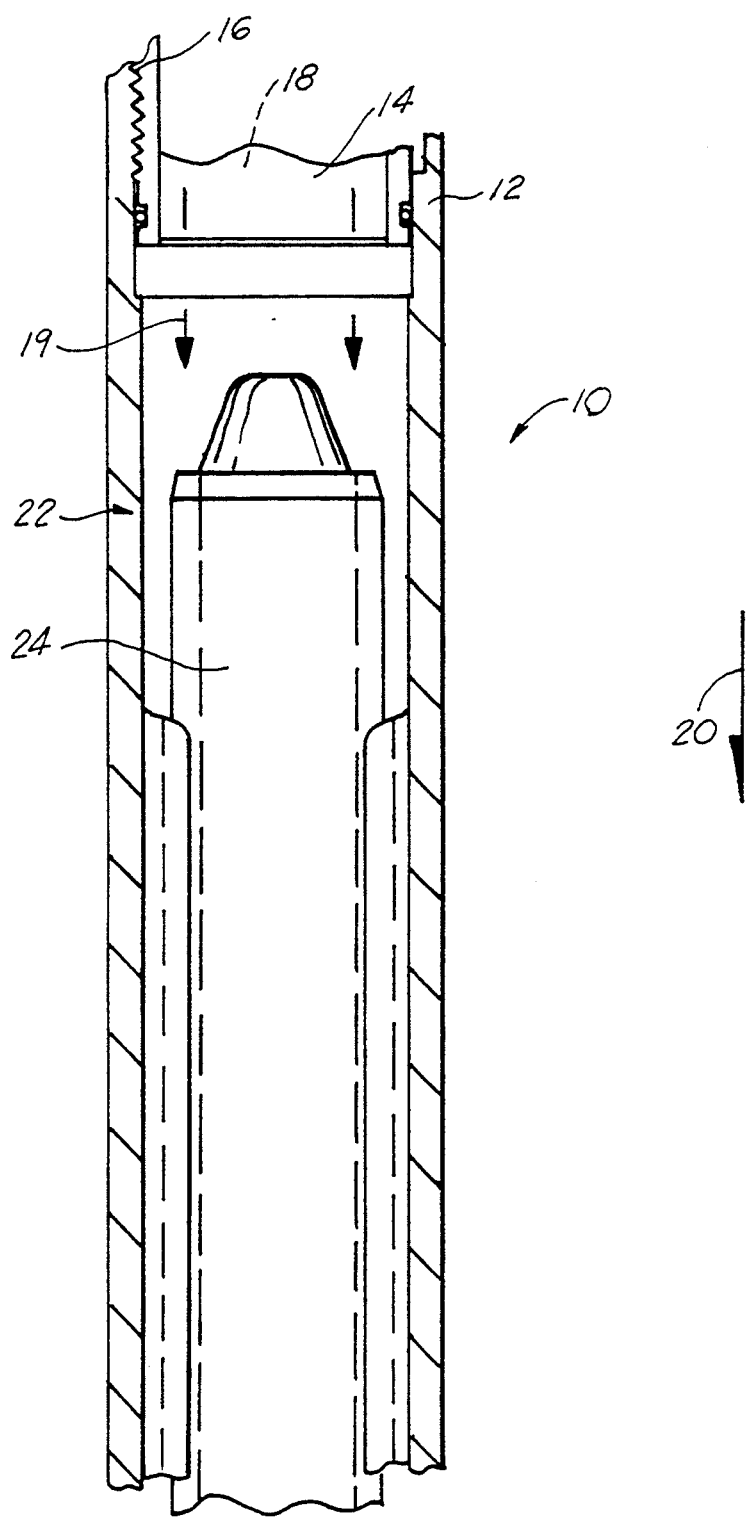
FIG. 1 illustrates a partial view of the upper portion of the mud motor assembly (the rotor and stator) attached to a top sub downhole.

FIGS. 1 through 18 illustrate the preferred embodiment of the complete mud motor assembly of the present invention. More particularly, FIGS. 1 through 6 illustrate cross section views of the general overall components of the present invention, which will be initially discussed. As seen in FIGS. 1 through 6, which if taken together, would comprise an overall view of the invention, mud motor assembly 10 is connected at its upper end 12 to a top sub 14, which is cylindrically shaped, and includes internal threads 16 for threadably engaging the upper end 12 of mud motor assembly 10. Top sub 14 would include a bore 18 through its body for allowing fluid (designated by arrow 19) to flow from the rig floor in the direction of arrow 20. The sub 14 would be threaded to the uppermost exterior component, the stator 22, which would serve as a housing for the rotor 24, as will be explained further, and is generally referred to as the motor portion of the system. Further, internally, the rotor 24 would be connectedly engaged to a drive shaft 26, with the drive shaft 26 housed within a drive shaft body 27, which externally is threadably engaged to the stator 22 via threads 29. The lower end of the drive shaft 26 is connected to an upper output shaft 28 which is in turn connected to a lower output shaft 30, which is then threaded to the drill bit 32. Externally, the upper and lower output shafts 28, 30 are housed within a bearing body 34 connected at its upper end 35 to the drive shaft body 27 and at its lower end to a seal body 37 which seals around the lower end of the lower output shaft 30 extending out of the seal body 37. Contained within and straddling the upper and lower output shafts 28, 30 is the sealing section 36, which is defined as that area positioned between an upper seal assembly 38 and a lower seal assembly 40, wherein the critical functions of the new assembly 10 function. Although these, in general, make up the major components of the assembly 10, the detailed components will be discussed, together with the novel construction and functions.

Figure 8:
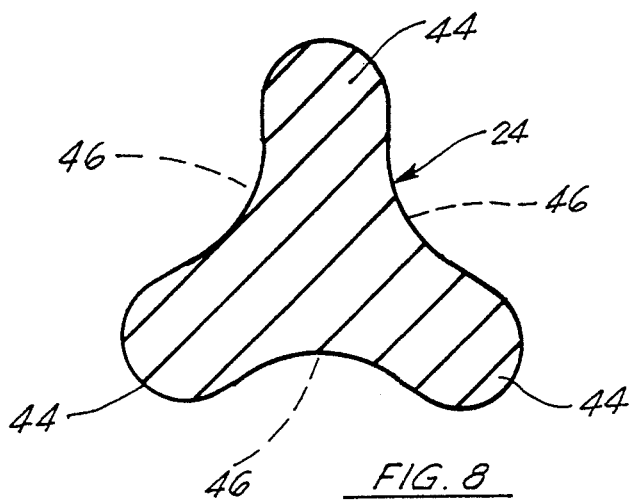
FIGS. 7 and 8 illustrate a four lobe stator and a three lobe rotor utilized in the preferred embodiment of the present invention.
Figure 7:
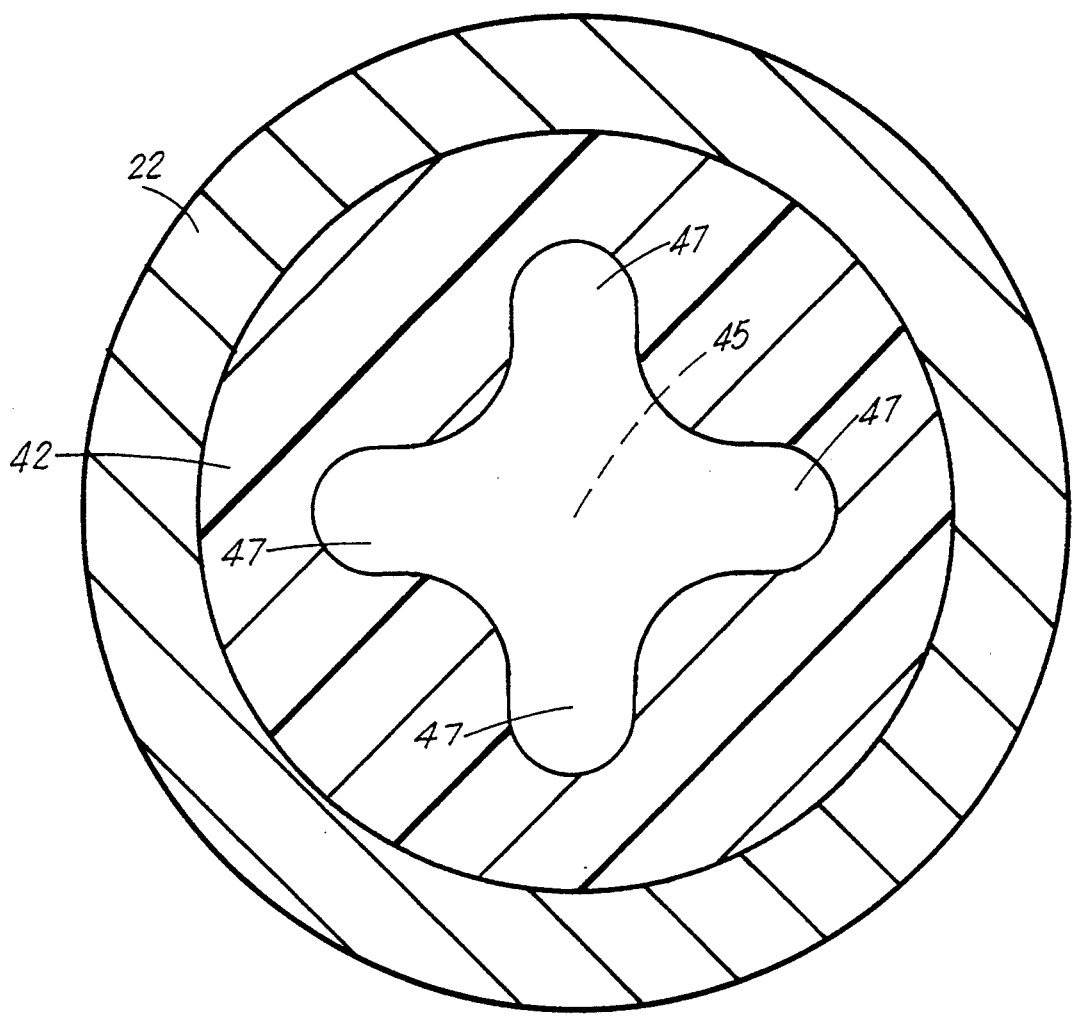
Figure 9:
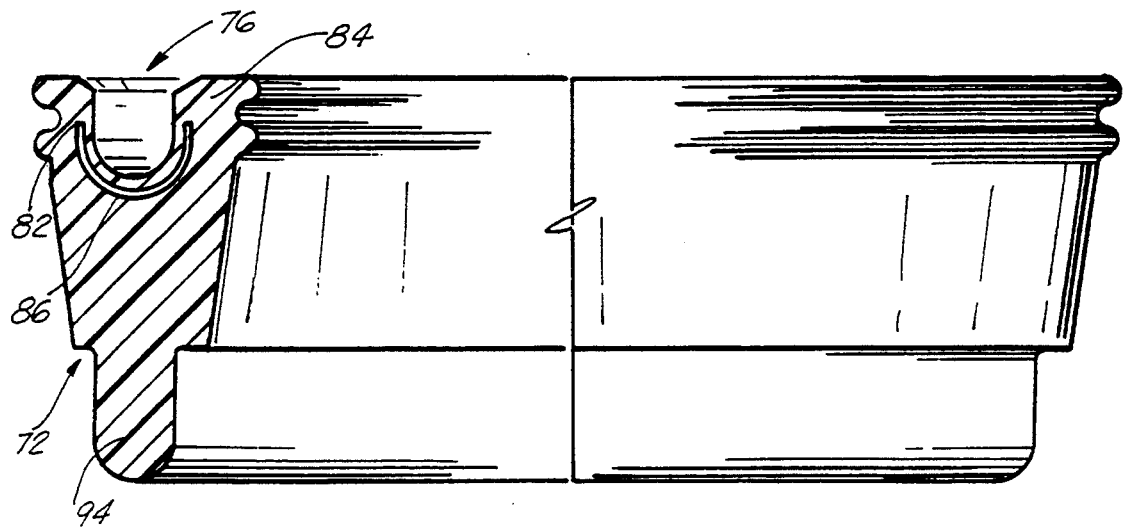
FIGS. 9 through 11 illustrate cross section views of the spring-assisted seal assemblies utilized in the preferred embodiment of the present invention.
Figure 11:
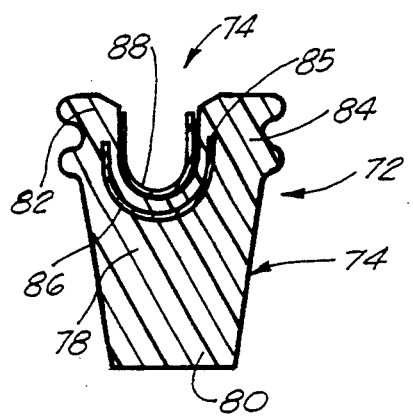
Figure 10:
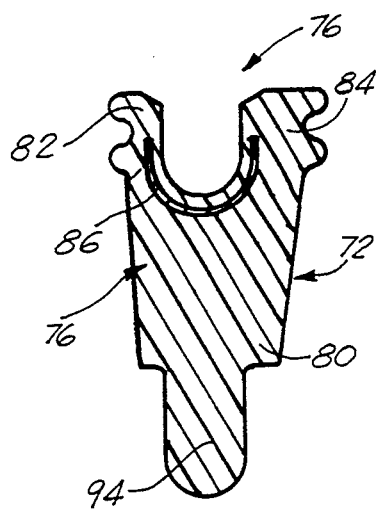

For an understanding of the rotor 24, and its function, reference should be made to FIGS. 7 and 8 which illustrate cross-section views of a three lobed rotor 24 and a four lobe stator 22. As seen in the figures, the rotor 24 extends throughout the length of stator 22, where there is provided a continuous rubber housing 42 between the stator 22 and the metal rotor 24. Metal rotor 24 comprises a series of lobes 44 and valleys 46, between each lobe 44, with lobes 44 spiraling down the length of the rotor 24 through the stator 22, which of course results in spiral valleys 46. As fluid 19 is pumped through the spiral stator valleys, the rotor 24 is forced to rotate, which ultimately imparts rotation to the drill bit 32, as will be discussed further. Since the fluid 19 flowing through the stator causes the rotation of the internal mechanisms to occur, this section is referred to as the motor section of the assembly. It should be noted that the particular design of the rotor 24 is critical since the construction of the lobes 44 and valleys 46 determine the torque which is required to operate the system at its optimum level. These optimal parameters will be discussed further.

Figure 2:
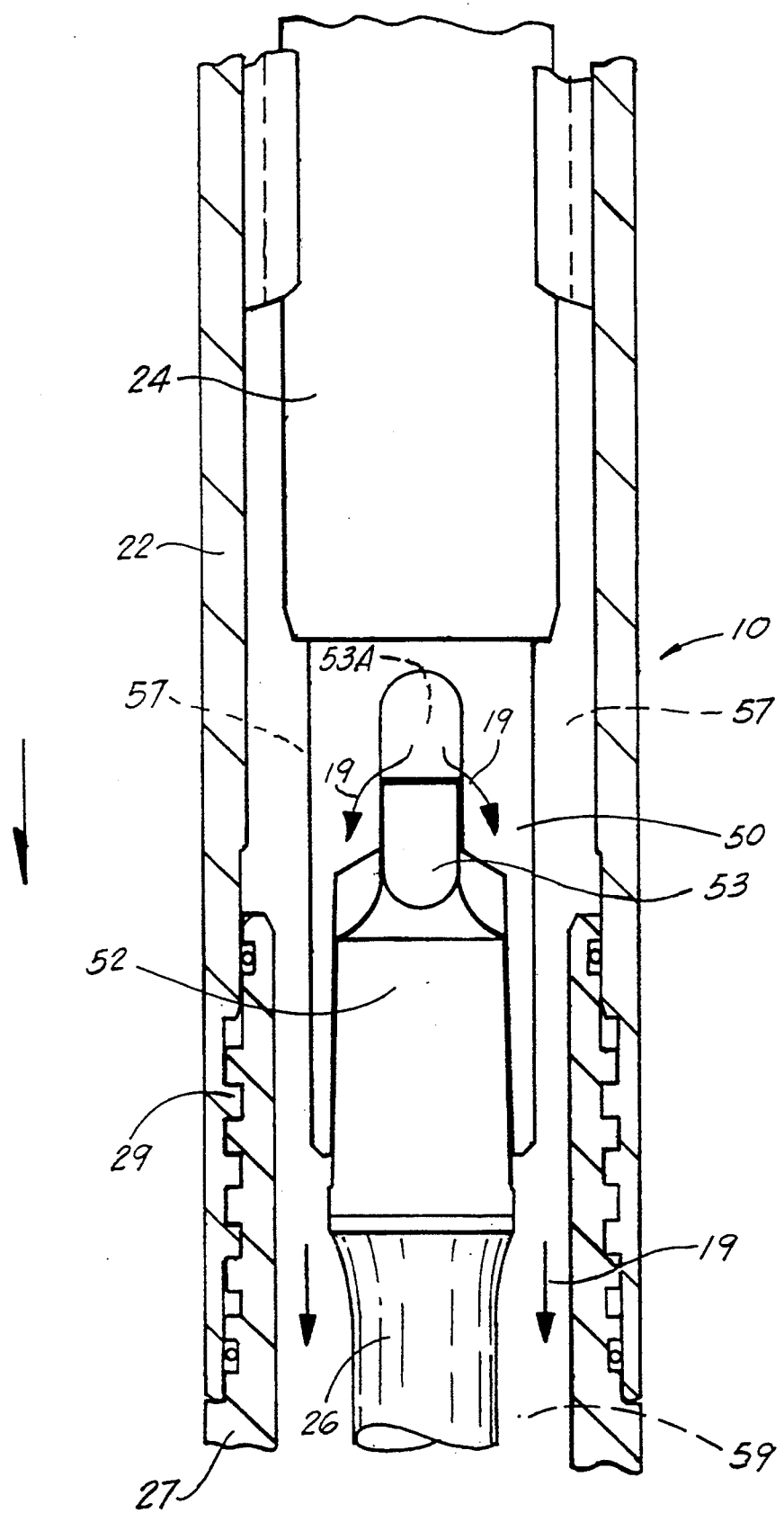
FIG. 2 illustrates a partial view of the lower portion of the rotor rotatably secured to the drive shaft in the mud motor assembly.

Turning now to FIG. 2, there is illustrated the lower end 50 of the rotor 24 connectedly engaged to the upper end 52 of drive shaft 26. As seen in the figure, the upper end 52 of shaft 26 is secured through a flat pin section 53 engaged in a slot 53a in the lower end 50 of rotor 24. This connection at 50 firmly secures the rotor 24 to the drive shaft 26, although the drive shaft 26 would tend to bend during the operation of the motor. At this connection point between the rotor 24 and shaft 26, the fluid which flows down through the valleys 46 of rotor 24, will exit the rotor 24 in the general area labeled as 57, and will flow in the annular space 59 between the shaft 26 and the outer drive shaft body 27, which houses the drive shaft 26. Generally, the drive shaft 26, because of its length and diameter, will have the ability to flex during rotation, as the fluid flows around it and down the assembly, after exiting the rotor 24.

Figure 3:
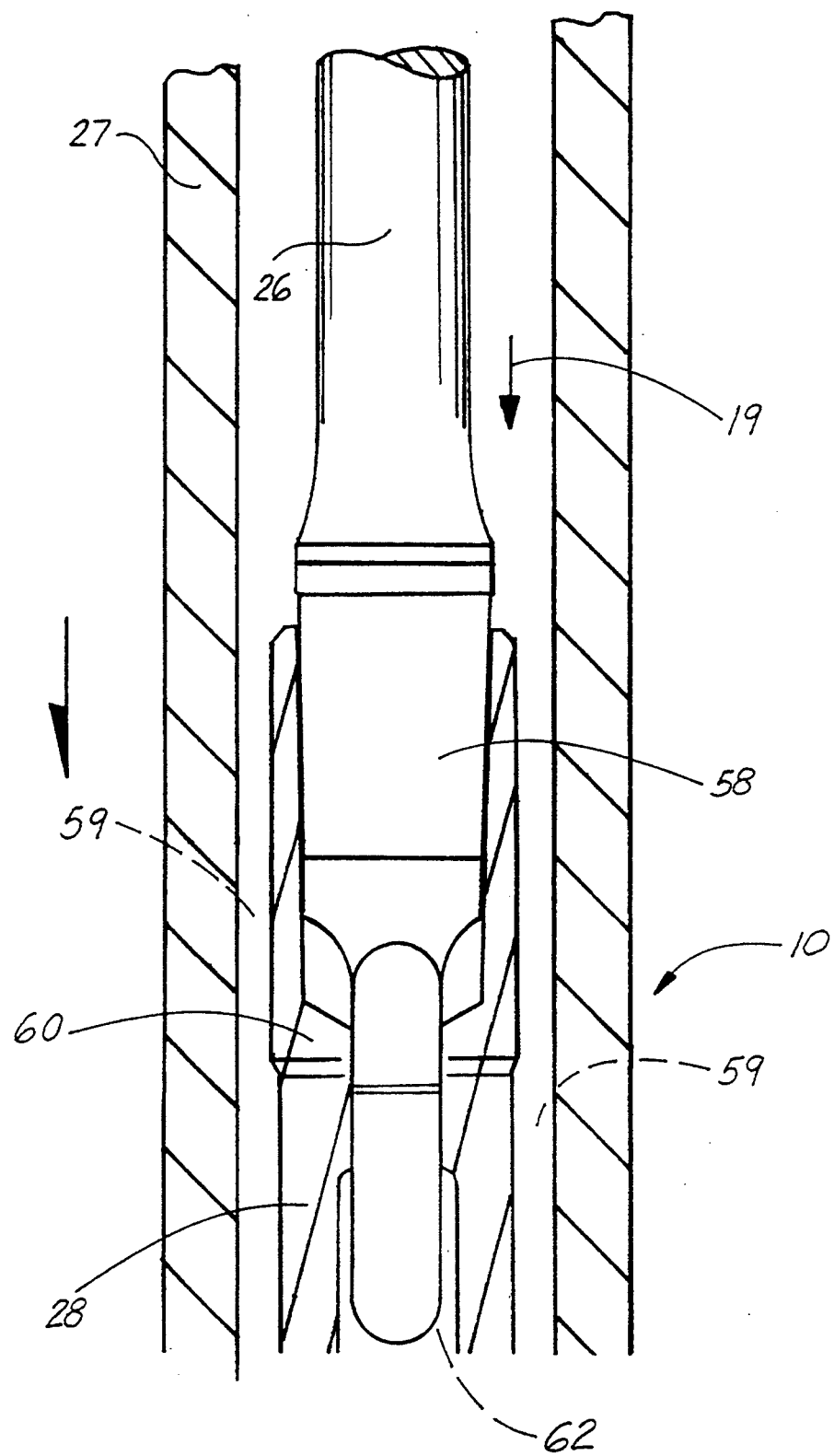
FIG. 3 illustrates a partial view of the lower end of the drive shaft secured to the upper output shaft in the mud motor assembly.

Reference is now made to FIG. 3 which illustrates the lower end 58 of drive shaft 26 keyed or connectedly engaged to an upper portion 60 of the upper output shaft 28, in a similar manner as described earlier in the connection between the drive shaft 26 and rotor 24. The connection, however, between the lower end 58 of drive shaft 26 and the upper end 60 of output shaft 28 defines a fluid flow bore 62 for allowing the fluid 19 which is flowing in the annular space 59 between drive shaft body 27 and drive shaft 26 to enter into a bore 62 within the upper output shaft 28, and to continue its flow down to the drill bit 32. The fluid 19 will exit from bit 32 and assist in washing the cuttings from the bit during drilling.

Figure 4:
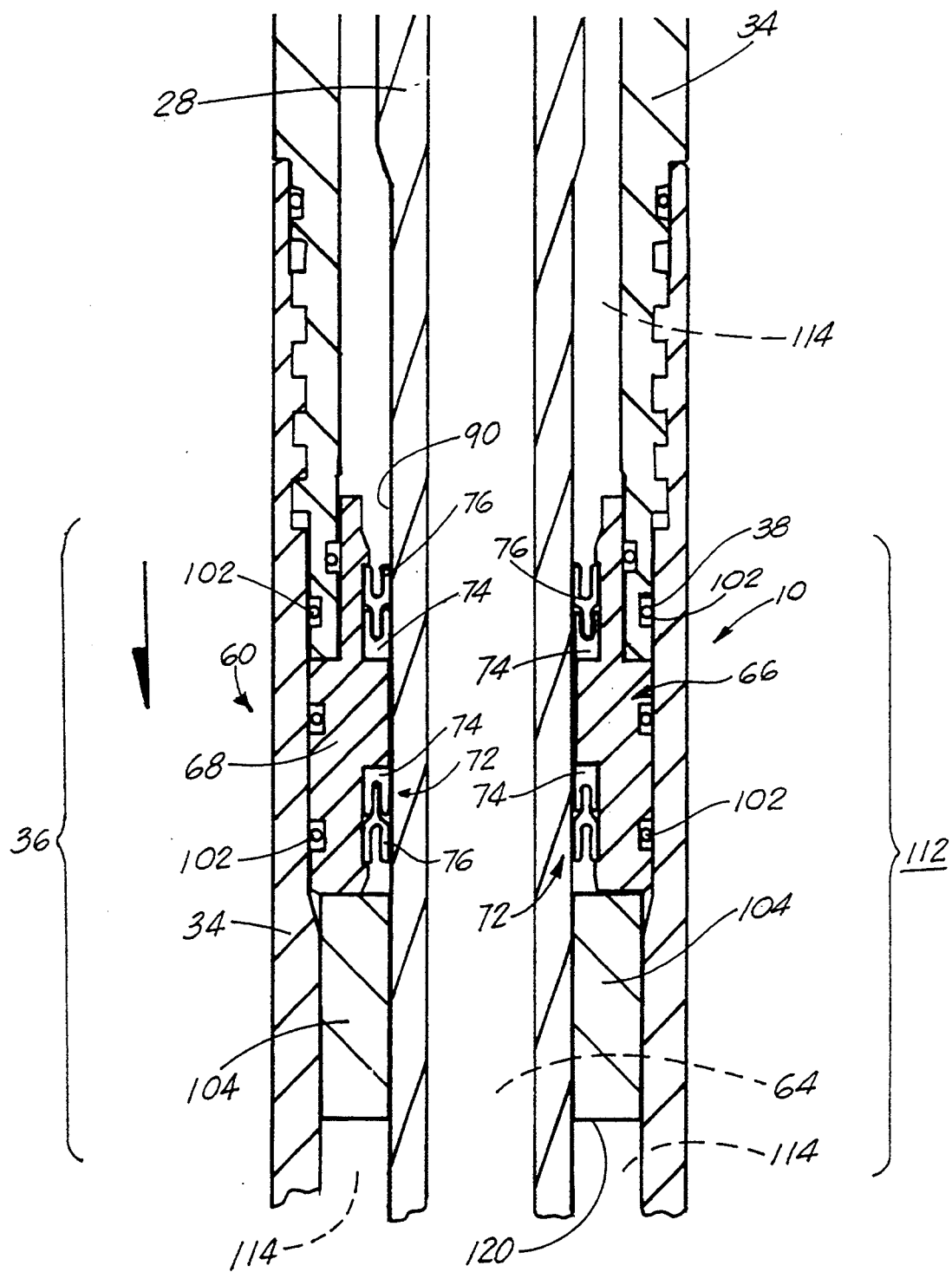
FIG. 4 illustrates that portion of the upper output shaft in the bearing body housing the packing retainer, upper seal assembly, upper bearing and fluid bearings.

FIG. 4 illustrates upper output shaft 28 as it would be threadably engaged to the lower output shaft 30. It should be noted that these two shafts 28 and 30 constitute shafts which are supported by bearing assemblies and fluid sealing means. Further, at this point the surfaces of shafts 28 and 30 are highly polished to accommodate the fluid seals, so that the fluid which drives the assembly 10, as previously discussed, will not get by the seals, but will enter the bore 64 of the output shaft 30 to continue to the bit.

Figure 5:
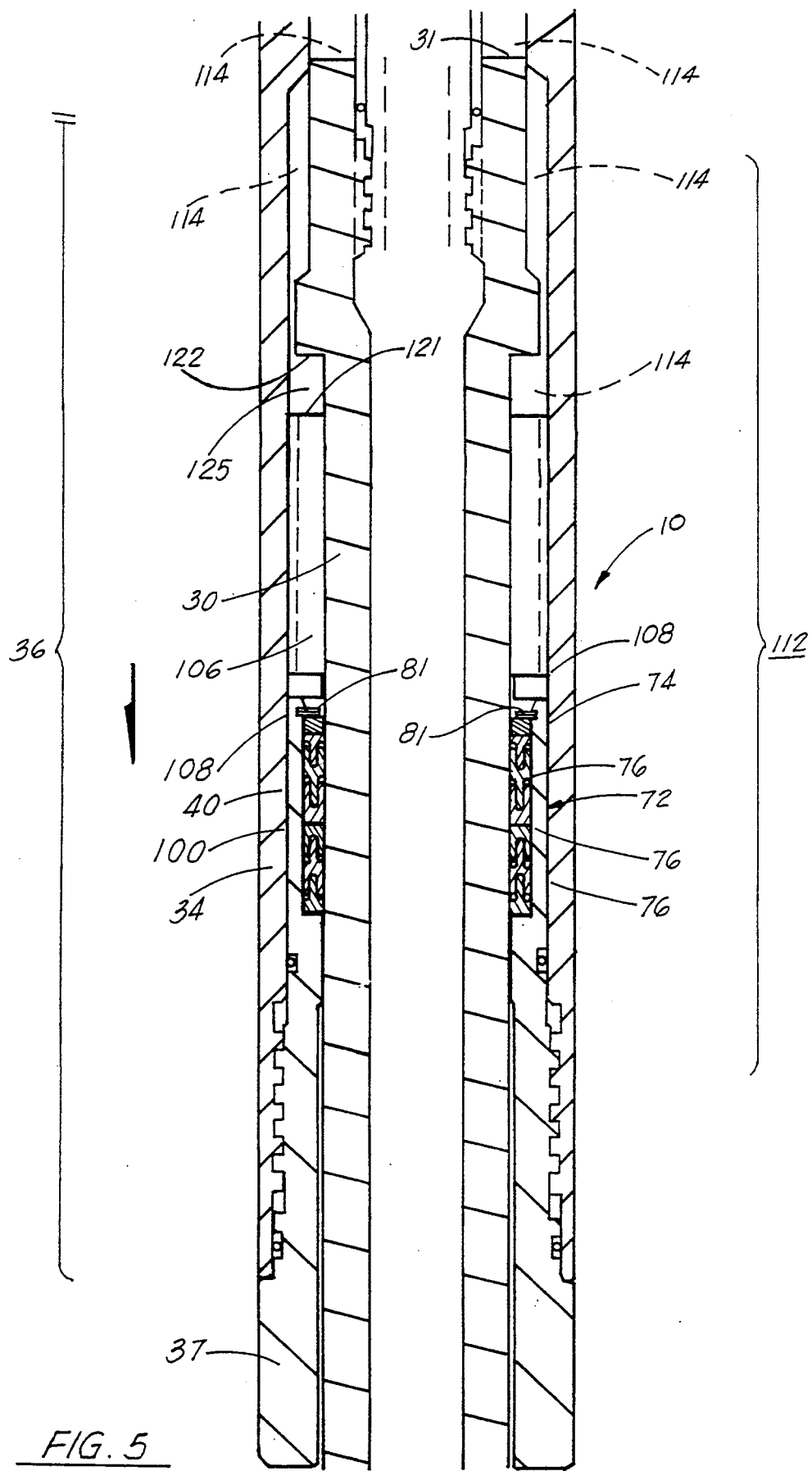
FIG. 5 illustrates that portion of the lower output shaft housing the lower bearing and the lower seal assembly.
Figure 6:
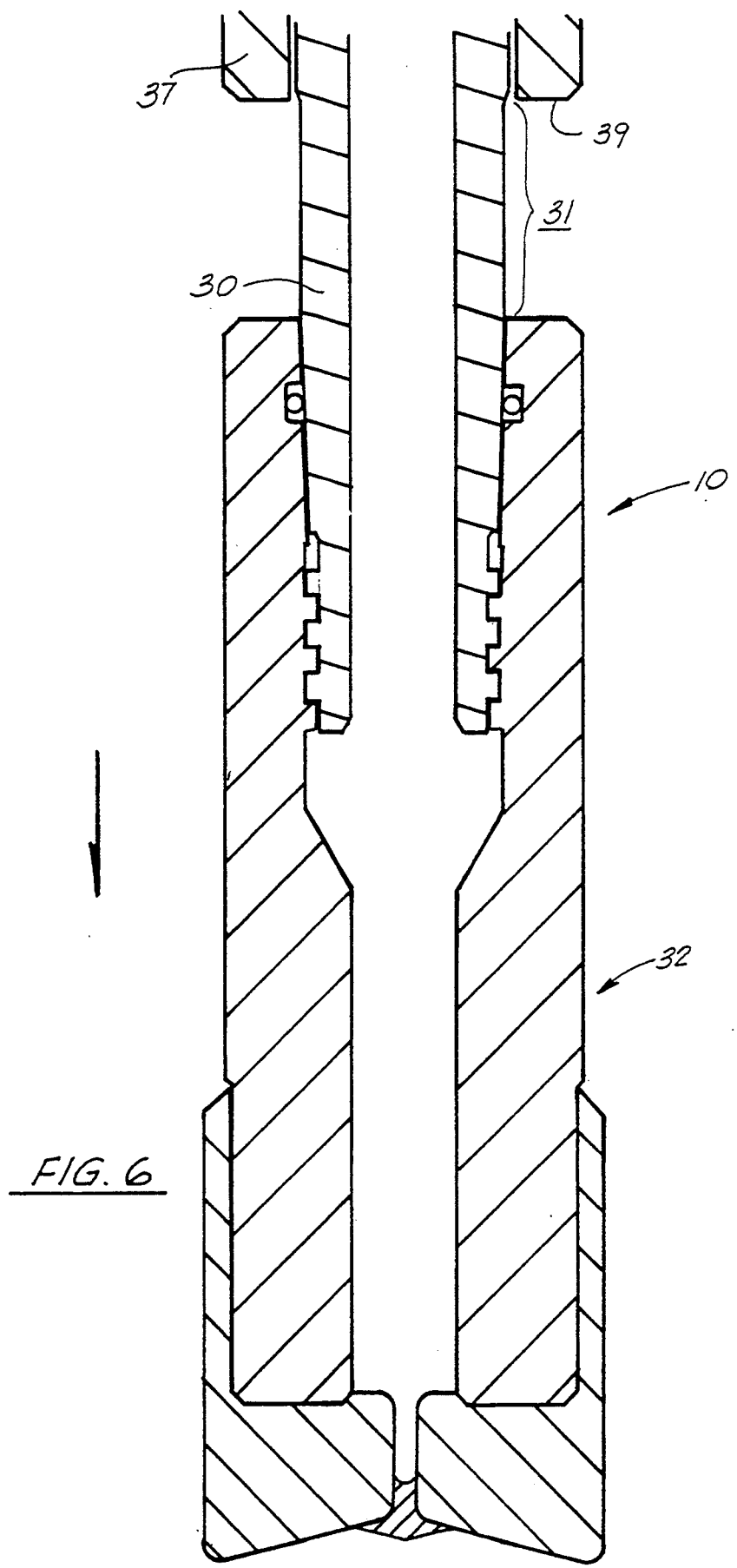
FIG. 6 illustrates the drill bit section of the mud motor assembly.

When discussing the next feature of the present invention, reference should be made to FIGS. 4 and 5 together. In these figures there is illustrated the primary sealing means of the present invention which is quite unique. This sealing means serves to capture a heavy oil within the sealing section, and to isolate it from the surrounding parts of the tool which accomplishes several critical functions that will be discussed. However, first a discussion will be had concerning the means by which the sealing section accomplishes its sealing function.

It is important to keep in mind, as previously discussed, that when the rotor 24 is rotated by the passage of the fluid 19, the rotor 24 tends to vibrate side to side, which, in turn causes the drive shaft to vibrate, together with the upper output shaft 28. This vibration would tend to lead to fluid leakage of the drive fluid 19 into the fluid seal section 36 of the assembly, or fluid leaking from the fluid seal section 36, as previously defined, to the outside. As seen in FIG. 4, there is positioned along the outer wall of the upper output shaft 28, a packing means 66, which comprises a packing retainer 68 filling the annular space 59 between the wall of the shaft 28 and the outer bearing body 34, which defines the outer wall of this portion of the assembly. Normally, the packing retainer 68 would be a sufficient seal. However, due to the vibration previously discussed there are positioned a series of spring loaded seal means 72, defining individual sealing members. Each of the seal means 72 are more clearly illustrated in FIGS. 9 through 11. As seen in those figures and in FIG. 4, in overall view, the seal means 72 would comprise two seal members 74 and 76. Member 74 would further comprise a flexible body 78, including a body portion 80 and a pair of flexing arms 82, 84, extending from the body portion 80. For purposes of construction, it should be noted in the FIGURES that arm 82 is substantially thinner than arm 84. The reason for this is that arm 82, being thinner, is able to respond more quickly to side to side shifts of the output shafts 28 and 30 during drilling. There is further provided a first metal spring member 86, housed within or on the body 78, and curved so that the ends 85 of the spring member 86 extends into each arm 82, 84. With this configuration, the arms, although flexible, when flexed, would instantaneously return to their normal position when released, due to the presence of the metal spring 86. There may also be provided a second spring 88 to provide greater flexion and return when the arms 82, 84 are flexed. Second sealing member 74 will be discussed further.

It should be noted that in addition to the unique spring configuration of the body portion 80, is the arrangement of the sealing members to form the continuous seal along the sealing surface. As seen in FIG. 4, there is illustrated a first plurality of sealing members, at least four as illustrated in the figure, positioned along a first sealing surface 90 between the packing retainer 68 and the wall of the upper output shaft 28, thus sealing the sealing section 36 from drive fluid 19 flowing into the section. However, there is further illustrated again four sealing members positioned between the inner surface of the bearing body 34, which houses the upper output shaft 28 and the packing retainer 68. These particular seals would have a double sealing action, first sealing the heavy bearing oil contained within sealing section 36 from flowing out of the section, and also sealing off from the fluid 19 entering the sealing section 36.

Figure 12:
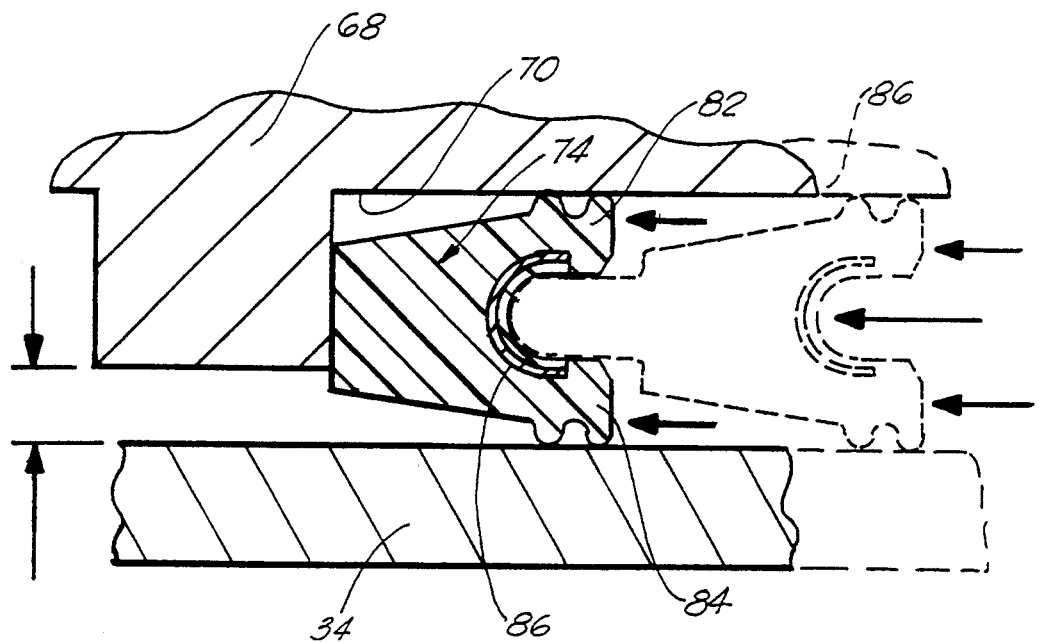
FIGS. 12 and 13 illustrate the sealing function of the sealing assemblies utilized in the preferred embodiment of the present invention.
Figure 13:
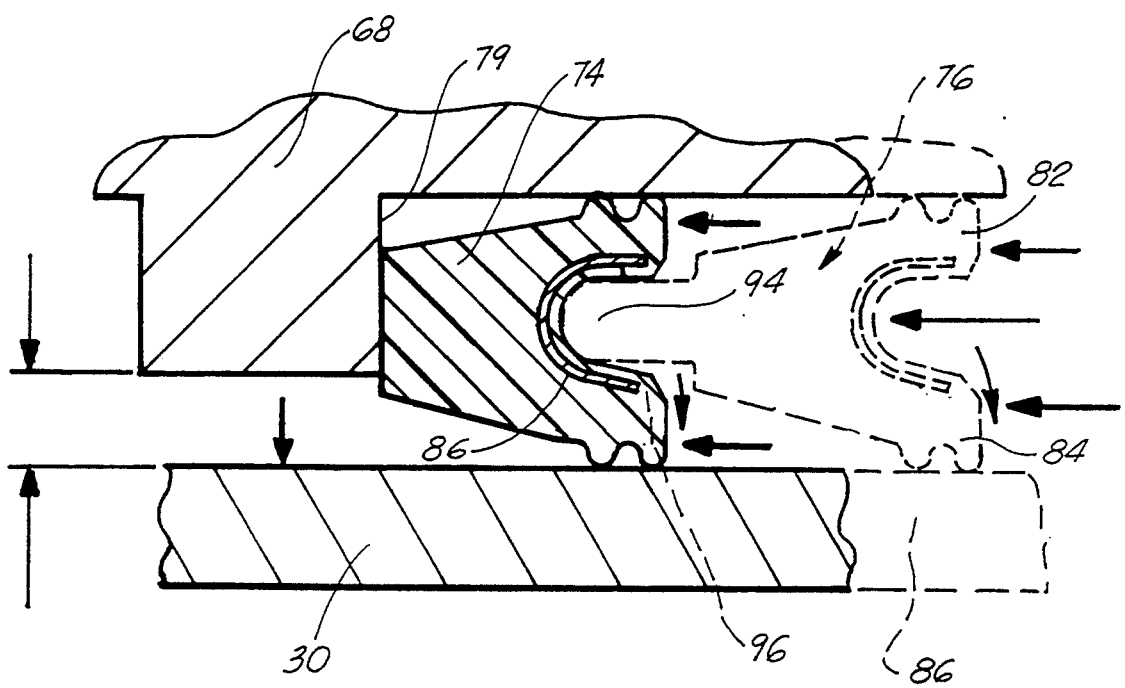

Turning now to the sealing members in greater detail, reference is made to FIGS. 12 and 13. In these figures, there is illustrated detail views of the sealing members 74, 76 as seen in FIG. 4. As illustrated, first member 74 would engage a flat surface 70 of packing retainer 68, and the flexing arms 82, 84 of the body portion 80 would extend upward, sealing against the wall of the packing retainer 68 and the wall of either the output shaft 30 or the wall of the packing retainer 68. In either case, the spring member or members 86 housed within or on body 80, and extending into flexing arms 82, 84, would maintain sufficient force on the flexing arms, so that the flexing arms 82, 84 would form a continuous seal between the surfaces, and would prevent fluid flow thereby. However, as illustrated, the sealing in this area does not depend on a single sealing member 74, but includes a plurality of members positioned to form a continuous interlocking sealing means.

As seen in FIGS. 12 and 13, there is illustrated a second sealing member 76, shown in phantom view, would be shaped essentially as the first member 74 previously described. However, its lowermost end would comprise a male member 94 extending from the body 80, and would be sealing engaged into the space 96 formed between the flexing arms 82, 84 of body portion 80. As seen in the figures, this defines a continuous seal between the body portions 80, between the surfaces. Although only two body members 74, 76 are illustrated, it is foreseen that these interlocking sealing members could be positioned in any number, with each interlocking the one before it and behind it to define the continuous seal.

To further illustrate the sealing ability of members 74, 76, reference is made to FIGS. 14 and 15, which illustrate a sealing member, 74, housed within a groove 75 of output shaft 30, with one of the arms 84 of member 74 making contact with the wall of seal body 37. Referring to both FIGS. 14 and 15 simultaneously, 15 illustrates a motion of the shaft 30 vibrating inward toward the wall of body 37, so that the arm 82 of member 74 is flexed inwardly, and as soon as a vibrating motion moves the shaft body away from body 37, the arm 82 flexes back into the position as seen in FIG. 14. It is this ability to flex and return to its original position instantaneously is what effects a continuous seal within the space 85 between the wall of the shaft 30 and the seal body 37.

As was stated earlier, it is important to note that the presence of the springs 86 within each sealing body 80 is critical in eliminating leakage of fluid by the sealing bodies during operation of the tool. Because of the flexion of the springs 86 within each body, as the upper output shaft would tend to wobble or vibrate within the bearing body 34, and would tend to create a gap between the upper output shaft 28 and the packing retainer 68, or the packing retainer 68 and the bearing body 34, the springs prevent this. Should the shaft 28 wobble or vibrate, the springs 74, 76 within the legs 82, 84 will have the legs flex outward and inward to follow the movement of the shaft, thus eliminating any gaps which would normally occur as a result of the vibration. This, of course, as stated earlier, would be true for preventing the drive fluid 19 seeping into the tool, or the bearing oil 92 from seeping out of the seal section 36 of the tool.

Although this discussion has concentrated on the sealing through the upper sealing assembly 38 as seen in FIG. 4, reference should be made to FIG. 5 wherein the same sealing means are utilized to seal the lower seal assembly 40 in the tool. The problem which is confronted in this portion of the tool, is to prevent the flow of fluids around the total assembly to seep into the lower drive area during drilling. As seen and discussed previously, the lower end of the upper output shaft 28 is attached to a lower output shaft 30, which in turn attaches to the bit 32. The lower output shaft 36 is housed within a seal body 37 at its lower end, so that fluid does not flow into the tool. The seal body 37 is threadably secured to the bearing body 34 and therefore, the only leakage possible is between the inner wall of the seal body 37 and the outer wall of the lower output shaft 30. This, again would normally occur as the bit vibrates during the drilling process.

Because of this potential for leakage there would be provided a lower sealing means 100 comprising a plurality of sealing members 74, 76 positioned between the lower output shaft 30 and the seal body 37 as illustrated in FIG. 5. As further noted in FIG. 5, the arrangement of the sealing members 74, 76 is unique in that a plurality of upper and lower sealing members 74, 76 are arranged back to back, to withstand the pressure from both sides within the system. As further illustrated, the lower sealing members 74, 76 rest upon a shoulder 79 within the wall of seal body 37, and the upper members 74, 76 are maintained in place via a metal ring 81 formed within the wall of the seal body 37. These members 74, 76 would be constructed identical to the members previously discussed, and again would flex along with the movement of the shaft 30, thus effecting a continuous, non-interrupted seal. Of course in both the upper and lower seal assemblies, there would be provided static seals in the form of O-rings 102 which would assist in the sealing function.

Turning now to another critical feature of the present invention, reference is made to FIGS. 4, 5 and FIGS. 14 through 16. As seen in FIG. 4, positioned directly below the upper seal assembly 38, and the packing retainer 68, there is placed an upper journal bearing 104, which is press fitted into the annular space between the outer bearing body 34 and the upper output shaft 28.

In addition, as seen in FIG. 5, there is a second journal bearing 106, press fitted between the wall of the bearing body 34 and the wall of the lower output shaft 30. It is held in place by a thrust plate 108 at its lower end. The journal bearings 104 and 106 serve to create the precise alignment of the output shafts 28, 30 and to take out the wobble during drilling.

In discussing this portion of the assembly, it is crucial to understand that in such mud motor systems, it is critical that the friction caused by the rotation of the output shafts 28, 30 in the housings is reduced as much a possible, so that torque on the bit is at its maximum potential. As thrust is applied on the bit 32 upward or downward, the bit tends to move upward or downward. For example, reference is made to FIG. 6 where there is illustrated bit 32 connected to the lower end of lower output shaft 30, which is housed on its lower end within seal body 37. As illustrated, there is a portion 31 of the shaft 30 exposed so that should force be applied on the bit, the shaft 30 will be free to move upward or downward before the bit 32 makes contact with the seal body 37.

So that the friction is minimized during this operation, there is provided a fluid bearing means positioned between the upper seal assembly 38 and the lower seal assembly 40, that means defined in general by the area designated by the numeral 112 in FIGS. 4 and 5. This fluid bearing means 112 would comprise generally a heavy oil or fluid sealed within the annular space 114 between the wall of the output shafts 28, 30 and the wall of the bearing body 37, between the upper and lower seal assemblies 38, 40 respectively. Critical to this means is the space defined between the upper end of lower output shaft 30, and upper journal bearing 104. This space 114 is filled with heavy oil trapped within that space by the sealing members 74, 76 previously discussed. Therefore, as force is placed upward on the drill bit 32, for example during drilling, the output shaft 30 tends to move the bit 32 toward the lower end 39 of the seal body 37. (See FIG. 6) When this occurs, the upper end of the lower output shaft 30 compresses the oil in space 114, which then provides a fluid bearing surface 120 against the upper end 31 of the output shaft 30, which would be virtually frictionless, since there is no contact between the shaft 30 and the upper journal bearing 104. In essence, the fluid bearing is formed by the difference in the annular areas at seal surfaces 90 and the outside diameter of output shaft 28. In the event the oil within space 114 is lost, the upper end of shaft 30 would simply contact the lower end of upper journal bearing 104 and ride on that surface as a thrust bearing until the oil could be reinstated in the space. In this particular design, the fluid bearing 112 will function as such when the bit is being forced upward during, for example, drilling.

Although this design would not accommodate a fluid bearing 112 when the bit 32 is being pulled, an embodiment of the tool could be designed to accommodate a fluid bearing 112, of the type described, for the shaft 30 to encounter a fluid bearing 112 in the event the shaft 30 is pulled down by the bit 32. Reference is also made to space 125, which is defined as the space between upper face 121 of the lower journal bearing 106 and the shoulder 122 on the wall of the lower output shaft 30. If one were to position the upper journal bearing 104 in the position of the lower journal bearing 106, and decrease the diameter of the shaft 30, accordingly, a space would be created which would be similar to the space 114 presently accommodating the fluid bearing. Therefore, to pull upward, which would, in effect tend to pull lower output shaft 30 down, the fluid within space 114 would be compressed between journal bearing 106 and shoulder 122, and thus would serve as a fluid bearing surface against the downward movement of shaft 30, as it would bear against shoulder 122 of shaft 30. In general, the concept is to provide a means for allowing the lower output shaft 30, when pulled down or forced upward, to encounter a fluid, rather than solid material, and thus ride on a fluid surface, to greatly reduce friction. Of course, as stated earlier, if the fluid bearing fails, there is a mechanical bearing to back it up and not suffer loss of or destruction of the assembly.

Figure 16:
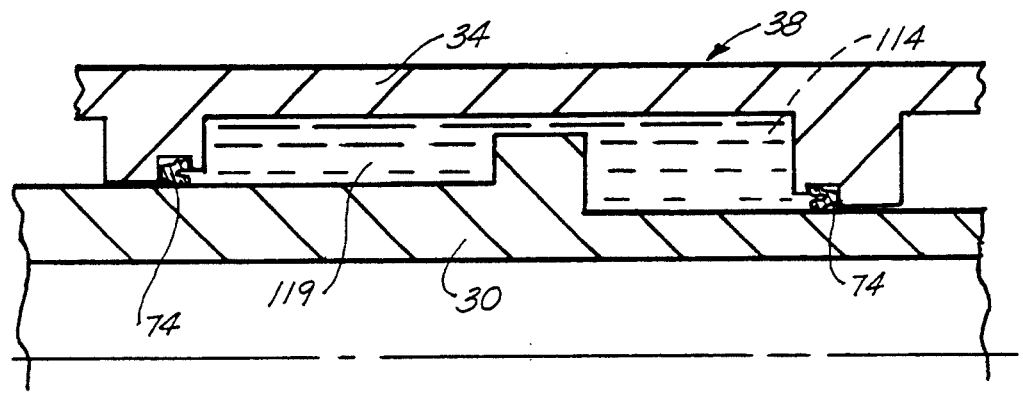
FIGS. 16 through 18 illustrate the principal and additional embodiments of the fluid bearings utilized in the system of the present invention, respectively.
Figure 17:
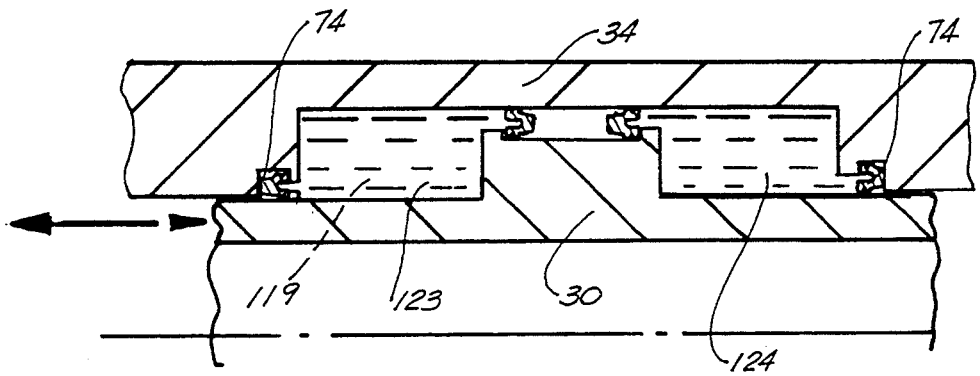
Figure 18:
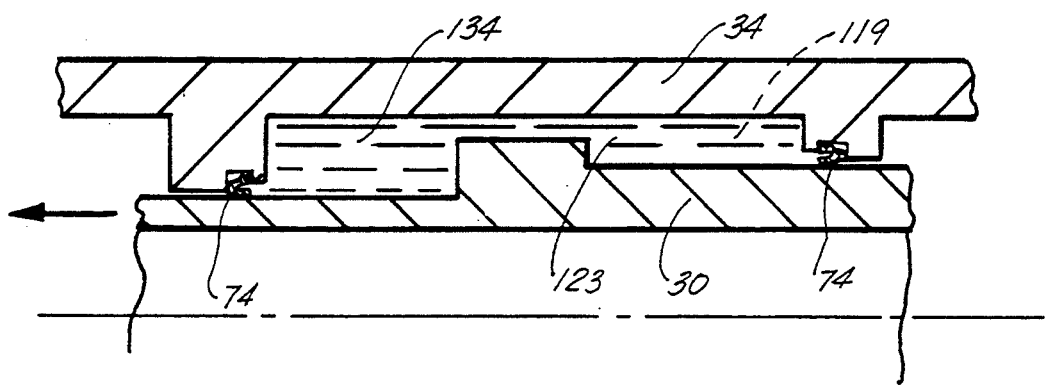

FIG. 16 illustrates the upper sealing assembly 38 utilized in the principal embodiment of the present invention, while FIGS. 17 and 18 illustrate alternate embodiments of the sealing assembly of the present invention. Reference is made in all three figures to that area of the sealing means between the bearing body 34 and the output shaft 30. In FIG. 16 there is illustrated the single acting compressive load fluid chamber 114, wherein the fluid 119 is held sealed in place via sealing members 74 on either end of the fluid chamber. In the alternate embodiment as illustrated in FIG. 17, the fluid chamber has been dissected into two separate chambers 123, 124 with seals 74 on each end of each chamber, and seals on the outside diameter of 30 to effect a double acting load mechanism to resist compression and tension loads. As illustrated in FIG. 18, there again is illustrated the single acting tension load mechanism. This design is aimed at resisting the opening force on the motor due to pulling up, with the larger chamber portion 134 serving as the primary fluid bearing, and the hydrostatic forces resisting any compressive loads which may occur.

Figure 19:
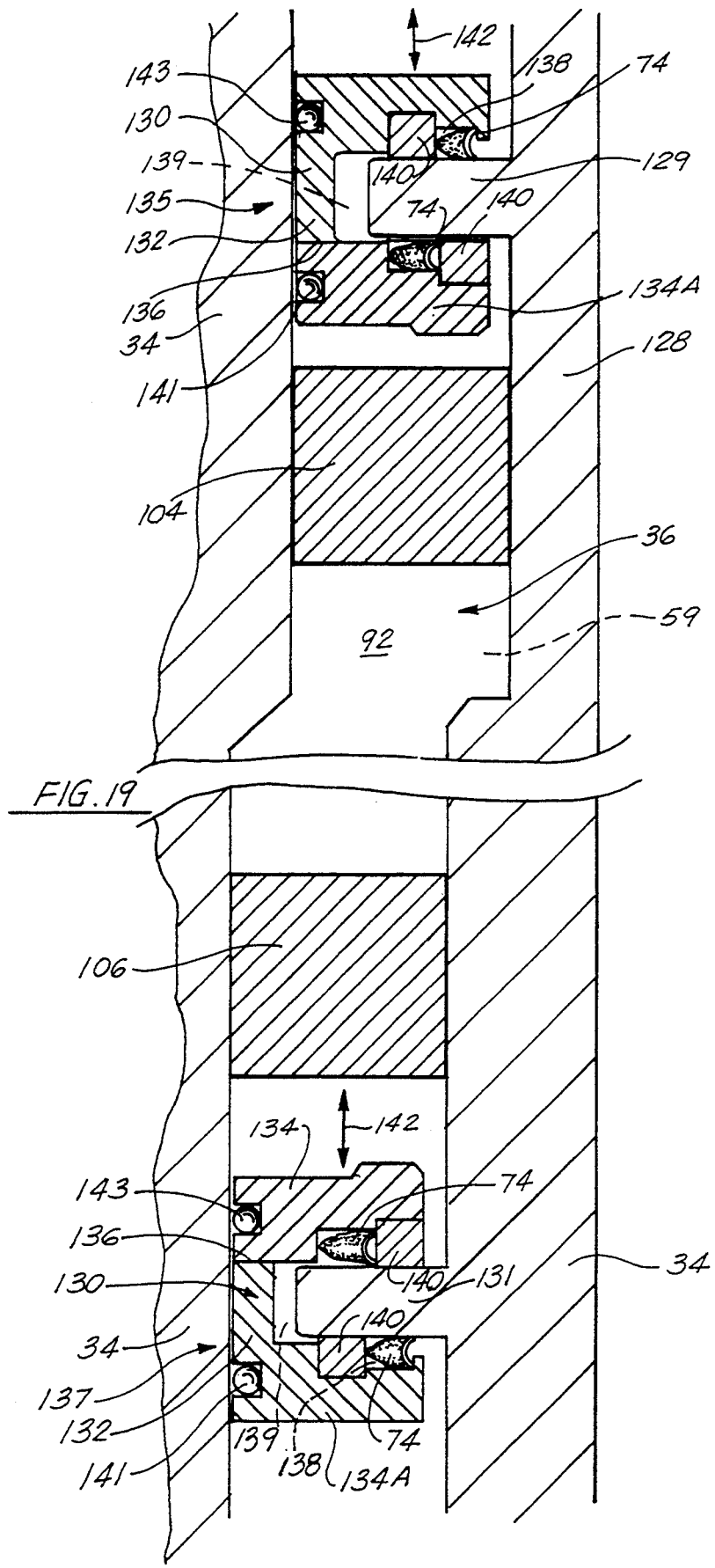
FIG. 19 illustrates an additional embodiment of the sealing assembly in the system of the present invention.

FIG. 19 further illustrates an additional embodiment system of the present invention relative to the manner in which the sealing assembly undertakes a seal between the upper and lower output shafts 28, 30 and the wall of the bearing body 34. In this particular embodiment, there is provided a modified output shaft 128 would include a first upper annular flange portion 129 positioned within the sealing section 36 of the system, which would house the bearing oil 92 in that annular space 59 between the shaft 128, the wall of bearing body 34, and positioned above the upper journal bearing 104. The FIGURE also illustrates a modified lower output shaft 130 which would likewise include a second lower annular flange portion 131 positioned below the lower jounal bearing 106 so that the sealing section 36 would be included between the upper and lower flanges 129, 131.

As illustrated, each of the upper and lower annular flanges 129, 131 would extend and be housed within an upper and lower seal assemblies 135, 137. Each sealing assembly would further include a sealing body 130 positioned around the inner body wall of the body 34, with seal body 130 including a vertical body portion 132 and a pair of spaced apart horizontal flange portions 134, 134A, to define a space 139 therebetween. The flange portions 134, 134A could be secured together via bolting or the like to define the complete seal body 130. The flange portions 134, 134A would extend into the annular space 59 between the shaft 128 and the body 34 so that the flange portions 129, 131 of shaft 128 and 130 would each be housed within space 139 defined by flanges 134, 134A of body 130. Each flange 134, 134A would further include one or more continuous channels 138 housing a plurality of seal members 74 which would be constructed as was described earlier in the patent. Seal members 74 would form a flexible continuous seal between each flange 129 and the upper face of flange 134, and the lower face of flange 134A of body 130.

The seal body 130 itself of seal assemblies 135, 137 would be engaged along the inner wall of housing 34, and would have the ability to slide upward and downward in the direction of arrows 142 as indicated in the FIGURES. Sealing assemblies 135, 137 would be maintained in the sealing engagement around the inner face of bearing body 34 via a pair of o-rings 141, 143. In this manner each of the sealing assemblies 135, 137 would travel upward and downward with the movement of the modified upper and lower output shafts 128, 130 to maintain the seal between the assemblies and the shafts. Further, as illustrated, the assemblies 135, 137 would further provide a thrust bearing 140 within the channels housing the spring loaded seals 74 to effect a complete seal, to avoid the oil flowing beyond the upper and lower assemblies out, or to prevent the mud within the system from entering the sealed area 36.

In this particular embodiment, it is foreseen that this "horizontal sealing" between the flange 129 and sealing assemblies 135, 137 would at all times seal due to the force of the rotating shaft 128 irregardless of whether rotating shaft 128 would wobble side to side or not. Even during wobbling of the shaft as seen in the FIGURES, the seal between the seal assemblies 135, 137 and the horizontal flanges 129, 131 of output shafts 128, 130 respectively, is maintained at all times in view of the fact that there is no vertical movement of the shafts during wobble, only side to side or horizontal movement which would not effect the sealing between the seals 74 and the shafts 128, 130. In this manner, the bearing oil 92 would be at all times maintained within the sealing section 36, between the upper and lower seal assemblies 135, 137, to maintain the oil 92 within the section, and to prevent mud from leaking in from above the upper assembly 135 or from below the lower assembly 137. The assemblies ability to maintain an oil reservoir between the assemblies would define the liquid thrust bearing portion of the system in this particular embodiment, as was discussed earlier.

Yet another embodiment, as seen in FIG. 20, would be very similar to the embodiment as illustrated in FIG. 19 and discussed earlier, and would carry out the same sealing function in the similar fashion; therefore, there will be no discussion of the functioning principles, as these were discussed in relation to FIG. 19. The principal diffence in this embodiment is the positioning of the journal bearings 104, 106. This embodiment would incorporate the upper and lower journal bearings 104, 106 into each sealing assembly 135, 137 as illustrated. Therefore, the journal bearings 104, 106 would be press fitted into an annular space between the wall of the sealing assembly 135, 137 and the wall of the output shafts 128, 130. In this manner, the sealing assemblies 135, 137 define single sealing components with the springloaded seals 74 and the journal bearings 104, 106 incorporated into the sealing assemblies as a single component.

The following table lists the part numbers and part descriptions as used herein and in the drawings attached hereto.

| GLOSSARY OF TERMS: | |
| --- | --- |
| mud motor assembly | 10 |
| upper end | 12 |
| top sub | 14 |
| threads | 16 |
| bore | 18 |
| fluid | (arrows 19) |
| arrow | 20 |
| stator | 22 |
| metal rotor | 24 |
| drive shaft | 26 |
| drive shaft body | 27 |
| upper output shaft | 28 |
| threads | 29 |
| lower output shaft | 30 |
| shaft portion | 31 |
| drill bit | 32 |
| bearing body | 34 |
| upper end | 35 |
| sealing section | 36 |
| seal body | 37 |
| upper seal assembly | 38 |
| seal body end | 39 |
| lower seal assembly | 40 |
| rubber housing | 42 |
| spiral lobes | 44 |
| spiral valleys | 46 |
| annular space | 48 |
| rotor lower end | 50 |
| drive shaft upper end | 52 |
| pin section | 53 |
| slot | 53A |
| outer drive shaft body | 54 |
| lower end | 55 |

-continued

| | |
|---|---|
| area | 57 |
| drive shaft lower end | 58 |
| annular space | 59 |
| upper end | 60 |
| lower end | 61 |
| fluid flow bore | 62 |
| bore | 64 |
| packing means | 66 |
| packing retainer | 68 |
| flat surface | 70 |
| seal means | 72 |
| first sealing member | 74 |
| second sealing member | 76 |
| body | 78 |
| body portion | 80 |
| flexing arms | 82, 84 |
| ends | 85 |
| first spring member | 86 |
| second spring | 88 |
| first sealing surface | 90 |
| bearing oil | 92 |
| male member | 94 |
| space | 96 |
| lower sealing means | 100 |
| O-rings | 102 |
| upper journal bearing | 104 |
| lower journal bearing | 106 |
| fluid bearing means | 112 |
| annular space | 114 |
| fluid | 119 |
| fluid bearing surface | 120 |
| chambers | 123, 124 |
| shoulder | 122 |
| lower journal upper end | 121 |
| space | 125 |
| shaft | 128 |
| upper flange portion | 129 |
| lower flange portion | 131 |
| upper seal assembly | 135 |
| lower seal assembly | 137 |
| sealing body | 130 |
| vertical body portion | 132 |
| horizontal flange portions | 134, 134A |
| space | 139 |
| o-rings | 135, 137 |
| thrust bearing | 140 |
| arrow | 142 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved mud motor system, comprising:
   a. a first upper rotating rotor portion connected to the lower end of a drill or workover string;
   b. a stator member housing the rotor, and defining a space for flowing fluid therethrough, and rotating the rotor within the stator;
   c. drive shaft means engaged to the lower end of the rotor and rotated as the rotor is rotated;
   d. a housing surrounding the drive shaft means and threaded to the lower end of the stator member;
   e. at least one output shaft having a bit on its lower end and rotatably engaged at its upper end to the lower end of the drive shaft or a second output shaft, for receiving the fluid from the rotor portion directing the fluid to the drill bit;
   f. a bearing body housing the output shaft and defining an annular fluid sealing portion between the output shaft and the bearing body;
   g. fluid housed within the annular sealing portion for defining a fluid bearing means allowing the output shaft to bear against the fluid when force is placed upon the drill bit, without the output shaft making metal to metal contact at its upper end; and
   h. sealing means for sealing the fluid within the fluid bearing means, said sealing means allowing lateral and vibrating movement of the output shaft during drilling, while effecting a continuous fluid seal within the fluid bearing means.

2. The system in claim 1, wherein the upper rotating rotor portion further comprises a plurality of spirally directed lobes along its length for rotating the rotor as fluid is passed therethrough.

3. The system in claim 1, wherein the stator member further comprises an internal flexible jacket between the wall of the stator and the wall of the rotor.

4. The system in claim 1, wherein the fluid bearing means is formed by the differential in the annular area between the output shaft and a second sealing surface in the system.

5. The system in claim 1, wherein the sealing means further comprises a flexible sealing member positioned between the wall of the output shaft and the bearing body wall, the sealing member further comprising a flexible loading member which would compress and flex in unison with the vibrating movement of the output shaft, so that the seal is maintained at all times during drilling.

6. The system in claim 5, wherein there may be included a plurality of sealing members positioned to form a stronger seal within the system.

7. The system in claim 5, wherein there is further provided a second sealing means within the system for sealing against fluid within the borehole from entering the mud motor system.

8. The system in claim 7, wherein the second sealing means is positioned between the flexible sealing member and the output shaft.

9. An improved mud motor system, comprising:
   a. a first upper rotating rotor portion connected to the lower end of a drill string;
   b. a stator member housing the rotor, and defining a spirally directed space for flowing fluid therethrough, and rotating the rotor within the stator by said fluid flow;
   c. drive shaft means engaged to the lower end of the rotor and rotated as the rotor is rotated by the fluid;
   d. a housing surrounding the drive shaft means and threaded to the lower end of the stator member, and defining a fluid flow space between the housing and the drive shaft means;
   e. at least one output shaft having a bit on its lower end and rotatably engaged at its upper end to the lower end of the drive shaft, for receiving the fluid from the rotor portion and drive shaft means, and directing the fluid to the drill bit through a bore within the output shaft;
   f. a bearing body housing the output shaft and defining an annular fluid sealing portion between the output shaft and the bearing body so that the fluid traveling down from the rotor enters the output shaft bore and is directed to the drill bit;
   g. fluid housed within the annular fluid sealing portion for defining a fluid bearing means allowing the output shaft to bear against the fluid when pressure is placed upon the drill bit, without the output shaft making metal to metal contact with an axial thrust component in the system; and h. sealing means for sealing the fluid within the fluid bearing means, said sealing means allowing lateral and vibrating movement of the output shaft during drilling, while effecting a continuous fluid seal within the fluid bearing means.

10. The system in claim 9, wherein the upper rotating rotor portion further comprises a plurality of spirally directed lobes along its length which effects rotation of the rotor when fluid is passed therethrough.

11. The system in claim 9, wherein the stator member further comprises an internal rubber jacket between the wall of the stator and the wall of the rotor.

12. The system in claim 9, wherein the fluid bearing means comprises a quantity of fluid compressible between the output shaft and a journal bearing for allowing the fluid to serve as a fluid bearing in the system.

13. The system in claim 9, wherein the sealing means further comprises a plurality of flexible sealing members positioned between the wall of the output shaft and the bearing body wall, the sealing members further comprising a loading member, such as a metal spring portion, which would compress and flex in unison with the vibrating movement of the output shaft, so that the fluid seal is maintained at all times during drilling.

14. The system in claim 13, wherein there is further provided a second sealing means within the system for sealing against fluid within the borehole from entering the mud motor system.

15. The system in claim 14, wherein the second sealing means is positioned between the flexible sealing members and the output shaft utilizing a plurality of interlocking sealing members.

16. The system in claim 9, wherein the plurality of sealing members positioned within the system are configured to interlock with one another to effect the total fluid seal.

17. An improved mud motor system of the type where there is included an upper stator portion housing a rotatable rotor which rotates as fluid is forced down through the rotor, a drive shaft rotatably connected to the rotor at its upper end; at least upper and lower output shafts rotatably connected to the drive shaft, and a bit engaged to the lower output shaft, the improvement comprising;

a) a first upper sealing means positioned between the output shafts and an outer housing; and b) fluid bearing means formed by fluid in the upper sealing means so that when force is placed on the drill bit during drilling, the fluid within the upper sealing means is compressed within the fluid means and defines a fluid bearing upon which an output shaft seats to prevent metal to metal contact between the output shaft and a metal member within the mud system.

18. The improved mud motor system in claim 17, further comprising at least a second lower seal means to prevent fluid from outside the tool from entering the tool body and the fluid bearing means.

19. The improved mud motor system in claim 17, wherein the flexible sealing members further comprise flexible loading members to maintain continuous sealing contact between the output shaft and the outer housing despite vibration of the output shaft during drilling.

20. An improved mud motor system, of the type where there is included an upper stator portion housing a rotatable rotor which rotates as fluid is forced down through the rotor, a drive shaft rotatably connected to the rotor at its upper end; at least upper and lower output shafts rotatably connected to the drive shaft, and a drill bit connected to the lower output shaft, the improvement comprising fluid bearing means formed by fluid contained in an upper sealing means so that when force is placed on the drill bit during drilling, the fluid within the upper sealing means is compressed within the fluid means and defines a fluid bearing surface upon which a output shaft seats to prevent metal to metal contact between the output shaft and a metal member within the mud system.

21. The improved mud motor system in claim 20, wherein the fluid bearing means may serve as a fluid bearing against output shaft contact with the lower housing when the bit is forced downward through pulling or the like.

22. The system in claim 20, further comprising a first upper sealing means positioned between the output shafts and an outer housing, further comprising flexible sealing members which flex with the lateral movement of the rotating output shafts, to form a continuous fluid seal for fluid contained within the upper sealing means.

23. An improved mud motor system, comprising:

a. a first upper rotating rotor portion connected to the lower end of a drill or workover string;

b. a stator member housing the rotor, and defining a space for flowing fluid therethrough, and rotating the rotor within the stator;

c. drive shaft means engaged to the lower end of the rotor and rotated as the rotor is rotated;

d. a housing surrounding the drive shaft means and threaded to the lower end of the stator member;

e. at least one output shaft having a bit on its lower end and rotatably engaged at its upper end to the lower end of the drive shaft for receiving the fluid from the rotor portion directing the fluid to the drill bit;

f. a bearing body housing the output shaft and defining an annular fluid sealing portion between the output shaft and the bearing body;

g. fluid housed within the annular sealing portion for defining a fluid bearing means allowing the output shaft to bear against the fluid when force is placed upon the drill bit, without the output shaft making metal to metal contact at its upper end; and h. sealing means for sealing the fluid within the fluid bearing means, said sealing means further providing a horizontal seal between the output shaft and the bearing body allowing lateral and vibrating movement of the output shaft during drilling, while effecting a continuous fluid seal within the fluid bearing means.

24. The system in claim 23, wherein the sealing means further comprises a sealing assembly postioned around the inner wall of the bearing body, defining a slot for housing a flange member on the output shaft, and further including sealing members within the slot to prevent fluid flow along the horizontal suface formed between the flange member and the sealing assembly.

25. The system in claim 24, wherein the sealing members further include at least springloaded seals housed within a channel formed in the sealing assembly and a thrust bearing housed within the slot.

26. The system in claim 23, wherein the sealing means further provides upper and lower sealing assemblies for sealing fluid within the annular space defined between the upper and lower sealing assemblies, so that there is effected a fluid thrust bearing within the system.

* * * * *